Patented May 14, 1935

2,001,275

UNITED STATES PATENT OFFICE 2,001,275

ETHER OF HYDROABIETYL ALCOHOL

Clyde O. Henke, Wilmington, Del., and Milton A. Prahl, Milwaukee, Wis., assignors to E. I. du Pont de Nemours & Company, Wilmington, Del., a corporation of Delaware No Drawing. Application September 20, 1933, Serial No. 690,232

17 Claims. (Cl. 260—149)

This invention relates to novel organic compounds and to a process for making the same. More particularly, this invention deals with ethers of hydroabietyl alcohol.

In copending application Ser. No. 648,242, we have disclosed a novel and efficient method of preparing hydroabietyl alcohol. This process, briefly, consists of reducing an ester of hydroabietic acid by the aid of a metal, such as sodium, in alcoholic solution. Either dihydro- or tetrahydroabietyl alcohol may be prepared by this method.

We have now found that these hydroabietyl alcohols may be converted into ethers by reacting them in the form of alkali-metal alcoholates with organic halides of the alkyl, aralkyl, or cycloalkyl series, following in a general way the known Williamson synthesis for other ethers. The requisite alkali-metal alcoholates in turn may be prepared by reacting hydroabietyl alcohol with an alkali-metal amide such as sodamide.

The new compounds have the general formula Ab—CH$_2$—O—R, where Ab stands for the hydrocarbon nucleus C$_{19}$H$_{31}$ or C$_{19}$H$_{33}$, of hydroabietic acid, while R stands for an alkyl, aralkyl or cycloalkyl residue. They may be used as plasticizers and water-proofing agents.

Of particular interest, however, are the sulfonic acid derivatives of these ethers. These possess valuable foaming and emulsifying properties. Some are also good wetting agents.

The sulfonic acids of the novel ethers may be prepared in two ways. The non-sulfonated ether may first be synthesized in the manner aforementioned, and then subjected to sulfonation in the usual manner for analogous compounds. Or hydroabietyl alcohol may be subjected to Williamson's synthesis with a halide of an alkyl, aralkyl or cycloalkyl sulfonic acid. By the latter method the position of the sulfonic acid group in the final compound is known, and the general formula for the same is Ab—CH$_2$—O—R—SO$_3$H, where Ab has the same significance as above, while R stands for an alkyl, aralkyl or cycloalkyl residue.

The sulfonic acids may be neutralized by a suitable base such as caustic potash, caustic soda, or ammonia, to produce the corresponding salt.

The novel ethers, when unsulfonated, are generally yellow to brown, viscous liquids, insoluble in water, but soluble in common organic solvents. The sulfonic acids, on the other hand, in the form of their salts, are white to yellow solids, readily soluble in water, dilute acids and dilute alkalies.

Without limiting our invention to any particular procedure, the following examples in which parts by weight are given will serve to illustrate our preferred mode of operation.

*Example 1.—Hydroabietyl benzyl ether*

29 parts of a hydroabietyl alcohol are dissolved in 200 parts of xylene, 6 parts of powdered sodamide are added, and the whole is refluxed with agitation for 1 hour. 18 parts of anhydrous, acid-free benzyl chloride are then added, and the mixture is refluxed with agitation for a period of 20 hours. The sodium chloride formed in the reaction is filtered off, the xylene is distilled out, and the resulting liquid is finally heated in vacuo at 135–140° C. to remove volatile matter. 42 parts of the hydroabietyl benzyl ether are obtained. It is a very viscous yellowish liquid.

*Example 2.—Hydroabietyl-sulfo-benzyl ether*

21 parts of the hydroabietyl benzyl ether as prepared in Example 1 are dissolved in 100 parts of tetrachlorethane, cooled to 0° C., and sulfonated by passing in 10 parts of sulfur trioxide obtained by distilling 20 parts of 60% oleum. After stirring 1 hour, 350 parts of water are added, the mixture is neutralized with sodium hydroxide, the tetrachlorethane is distilled off, and the solution is evaporated to dryness. 25 parts of a yellow solid are obtained, which is readily soluble in water, dilute acid, and dilute alkalies. The solutions foam strongly.

*Example 3.—Hydroabietyl-beta-sulfo-ethyl ether*

29 parts of a hydroabietyl alcohol are dissolved in 200 parts of xylene, 6 parts of sodamide are added, and the mixture is refluxed 1 hour with stirring.

21 parts of sodium-bromoethane-sulfonate are then added, and the mass is refluxed, using an air condenser, and allowing the xylene to distill out gradually, during 2 hours. The mass is then heated at 160–170° C., with stirring, for 22 hours. The paste is cooled and extracted with alcohol; the extract is steam distilled to remove the alcohol and other volatile products, and the water solution thus obtained is filtered and evaporated.

The product most probably has the formula Ab—CH$_2$—O—CH$_2$—CH$_2$—SO$_3$Na. It is a white solid, which dissolves readily in water; the solution foams strongly and possesses good wetting out properties.

In analogous manner other ethers of the hydroabietyl alcohols may be prepared. By the use of polyhalides, such as ethylene-dibromide or dichlorhydrin, the corresponding diethers may be obtained.

It will be understood that many variations are possible in our preferred mode of procedure without departing from the spirit of this invention. Thus, although we preferred to follow the Williamson synthesis, any other known method for etherifying high-molecular alcohols may be employed. The sulfonation similarly may be conducted along lines analogous with the known sulfonations of high-molecular alkyl ethers. For instance, instead of sulfur trioxide gas, concentrated sulfuric acid, oleum, chlorosulfonic acid, or sulfuric acid and acetic anhydride may be employed.

We claim:

1. A compound of the general formula

Ab—CH₂—O—R, where Ab stands for the hydrocarbon nucleus of a hydroabietic acid while R stands for an alkyl, aralkyl or cycloalkyl radical.

2. A compound of the general formula

Ab—CH₂—O—R, where Ab stands for the hydrocarbon nucleus of a hydroabietic acid, while R stands for an alkyl, aralkyl or cycloalkyl radical, and wherein either nucleus may carry sulfonic acid groups.

3. A compound of the general formula $$[Ab—CH_2—O—R]—SO_3M,$$

where Ab stands for the hydrocarbon nucleus of a hydroabietic acid, R stands for an alkyl, aralkyl, or cycloalkyl radical, and M stands for hydrogen or an alkali-metal or NH₄.

4. A compound of the general formula

Ab—CH₂—O—R—SO₃M, where Ab stands for the hydrocarbon nucleus of a hydroabietic acid, R stands for an alkyl, aralkyl, or cycloalkyl radical, and M stands for hydrogen or an alkali-metal or NH₄.

5. A benzyl ether of a hydroabietyl alcohol.

6. The benzyl-ether of a hydroabietyl alcohol.

7. A hydroabietyl-sulfobenzyl ether.

8. A hydroabietyl-beta-sulfoethyl-ether.

9. The process of preparing an ether, which comprises reacting an alkali-metal hydroabietyl alcoholate with an organic halide of the alkyl, aralkyl and cycloalkyl series which may be substituted by sulfo groups.

10. The process of preparing an ether-sulfonic acid compound which comprises reacting an alkali-metal hydroabietyl alcoholate with an organic halide of the alkyl, aralkyl and cycloalkyl series halide, and subjecting the intermediate ether thus formed to sulfonation.

11. The process of preparing an ether sulfonic acid compound which comprises reacting an alkali-metal hydroabietyl alcoholate with an alkyl-halide-sulfonic acid.

12. The process of preparing an ether sulfonic acid compound which comprises converting a hydroabietyl alcohol into an alkali-metal alcoholate thereof, and refluxing the latter in an inert organic solvent with an organic halide of the alkyl, aralkyl and cycloalkyl series.

13. The process of preparing an ether sulfonic acid compound which comprises converting a hydroabietyl alcohol into an alkali-metal alcoholate thereof, and refluxing the latter in an inert organic solvent with a sulfo-alkyl-halide.

14. The process of preparing an ether sulfonic acid compound which comprises reacting with a sulfonating agent upon an ether of a hydroabietyl alcohol, and recovering the product in the form of a salt thereof.

15. The process of preparing an ether sulfonic acid compound which comprises refluxing a mixture of sodium-bromoethane-sulfonate and the sodium alcoholate of a hydroabietyl alcohol in xylene, extracting the reaction mass with alcohol, steam distilling the extract, and evaporating the aqueous solution formed, to obtain the sodium salt of the hydroabietyl-beta-sulfoethyl-ether.

16. In the process of preparing an ether of a hydroabietyl alcohol, the step which comprises converting the latter into its sodium alcoholate.

17. In the process of preparing an ether of a hydroabietyl alcohol, the step which comprises reacting a hydroabietyl alcohol with sodamide to form the sodium alcoholate of the hydroabietyl alcohol.

CLYDE O. HENKE.
MILTON A. PRAHL.

CERTIFICATE OF CORRECTION.

Patent No. 2,001,275.      May 14, 1935.

CLYDE O. HENKE, ET AL.

It is hereby certified that error appears in the printed specification of the above numbered patent requiring correction as follows: Page 2, second column, line 8, claim 10, strike out the word "halide"; and that the said Letters Patent should be read with this correction therein that the same may conform to the record of the case in the Patent Office.

Signed and sealed this 2nd day of July, A. D. 1935.

Leslie Frazer

Acting Commissioner of Patents.

(Seal)